US006253349B1

United States Patent
Maeda et al.

(10) Patent No.: US 6,253,349 B1
(45) Date of Patent: Jun. 26, 2001

(54) ERROR DETECTIVE INFORMATION ADDING EQUIPMENT

(75) Inventors: Toshinori Maeda, Osaka; Hidenori Akiyama, Kyoto; Hiroyuki Yabuno, Osaka, all of (JP)

(73) Assignee: Matsushita Electric Industrial Co., Ltd., Osaka (JP)

( * ) Notice: Subject to any disclaimer, the term of this patent is extended or adjusted under 35 U.S.C. 154(b) by 0 days.

(21) Appl. No.: 09/194,665

(22) PCT Filed: Mar. 30, 1998

(86) PCT No.: PCT/JP98/01452

§ 371 Date: Dec. 1, 1998

§ 102(e) Date: Dec. 1, 1998

(87) PCT Pub. No.: WO98/44415

PCT Pub. Date: Oct. 8, 1998

(30) Foreign Application Priority Data

Apr. 2, 1997 (JP) .................................................... 9-083637
Apr. 2, 1997 (JP) .................................................... 9-083638

(51) Int. Cl.[7] ......................... G06F 11/00; G08C 25/00; H03M 13/00; H04L 1/00
(52) U.S. Cl. ........................................................... 714/799
(58) Field of Search ..................... 714/799, 746, 714/781, 764, 784–785, 805, 761; 712/232; 710/20–22, 40, 244; 708/492; 369/32, 59.25, 275.3, 33, 27, 30

(56) References Cited

U.S. PATENT DOCUMENTS

| 4,309,755 | * | 1/1982 | Lanty ....................................... 710/21 |
| 4,736,352 | * | 4/1988 | Satoh et al. ............................. 369/32 |
| 5,349,671 | * | 9/1994 | Maeda et al. .......................... 712/234 |
| 5,752,068 | * | 5/1998 | Gilbert ................................... 712/16 |
| 5,778,180 | * | 7/1998 | Gentry et al. ......................... 709/212 |
| 5,914,969 | * | 6/1999 | Yabuno et al. ........................ 714/784 |
| 6,041,368 | * | 3/2000 | Nakatsuji et al. ...................... 710/20 |
| 6,092,186 | * | 7/2000 | Betker et al. ......................... 712/233 |

FOREIGN PATENT DOCUMENTS 8-273307 * 10/1996 (JP) ................................ G11B/20/18

OTHER PUBLICATIONS

Garcia–Harro et al. (ATM Shared–Memory Switching Architectures; IEEE; Aug. 1994).*
Chen et al.(Microarchitecture of HaL's Cache Subsystem; IEEE; Mar. 1995).*

* cited by examiner

Primary Examiner—Albert Decady
Assistant Examiner—Guy Lamarre
(74) Attorney, Agent, or Firm—Price and Gess

(57) ABSTRACT

An error-detecting information adding apparatus transfers original data received from an external host apparatus to a memory and to an error-detecting code generating unit in one DMA transfer so that while the original data is transferred to the memory, an error-detecting code is generated. The error-detecting code generated by the error-detecting code generating unit is transferred from the error-detecting code generating unit to the memory.

9 Claims, 17 Drawing Sheets

ERROR DETECTIVE INFORMATION ADDING EQUIPMENT

FIELD OF THE INVENTION

This invention relates to an error-detecting information adding apparatus for adding error-detecting information to data to be recorded onto recording mediums in a system for recording data onto recording mediums or to data to be transferred in a communications system.

BACKGROUND OF THE INVENTION

Recently, great efforts have been made to develop efficient techniques for digitizing information and recording or communicating large amounts of digitized data. In conjunction with the efforts, techniques for increasing the reliability of data have also been improved.

A known technique of this field has succeeded in increasing the reliability of the data by adding error-correcting codes to the data.

This technique deals with errors which may happen in data transfers via communication paths, such as data read errors due to minor flaws, stains, or dusts on mediums like optical discs, and deals with data reception errors due to multipath fading in communications. In this technique, error-correcting codes are previously added to data before the data is recorded onto recording mediums or transmitted via communications. The added error-correcting codes are used to correct the data when the data is read by data reading apparatuses from the recording mediums or received by data receiving apparatuses via communications.

Another technique has also been developed to deal with errors which cannot be corrected with the error-correcting codes. In the other technique, data recording or transmitting apparatuses further add error-detecting codes so that errors due to the error correction can be detected.

A conventional technique for adding error-detecting codes to data used in a process of recording data in a conventional optical disc recording system is described below with reference to FIGS. 1–5.

FIG. 1 shows a construction of a conventional optical disc recording system 9000.

The conventional optical disc recording system 9000 receives data from an external host apparatus 9900, adds headers, error-detecting codes, and error-correcting codes to the received data, modulates the data, and writes the modulated data onto the DVD. The conventional optical disc recording system 9000 includes a bus 9001, a microcomputer 9010, a DMA controller 9020, an input interface unit 9030, a scramble unit 9040, an EDC generation unit 9050, a buffer interface unit 9060, a buffer memory 9061, an ECC generator 9070, a modulating unit 9080, and an optical disc recording unit 9090.

The DVD is an optical disc. Hereinafter, the DVD is called optical disc. Also, of the data transferred from the external host apparatus 9900 to be recorded in the optical disc, an amount of data corresponding to a data field which will be described later is called original data. Therefore, it may happen that the external host apparatus 9900 transmits a plurality of pieces of original data.

Now, the construction of information to be recorded onto the optical disc is described below.

FIG. 2 shows a configuration of the data sector. FIG. 3 shows a configuration of the ECC block.

Here, the data sector is a unit of data standardized for the DVD, and the ECC block is a unit of data used in adding error-correcting codes, where ECC stands for Error-Correcting Code.

As shown in FIG. 2, each data sector is composed of a header field, a data field, and an EDC (Error-Detecting Code). As shown in FIG. 3, each ECC block is composed of 16 data sectors and two kinds of error-correcting codes: an inner parity correcting code, and an outer parity correcting code. The error-correcting codes are product codes by the Reed-Solomon codes.

The header field is composed of an ID code, an error-correcting code (IEC) related to the ID code, and a reserve area. The ID code is address information related to the current data sector.

The data field is composed of 2,048 bytes of data which is the original data having been subjected to a scramble which will be described later.

The components of the optical disc recording system 9000 are described below (see FIG. 1).

The microcomputer 9010, including a ROM storing a program to be executed, controls the entire operation of the optical disc recording system 9000 by receiving data transfer notifications from the external host apparatus 9900. The microcomputer 9010 also generates headers to be attached to the original data and writes the generated headers into the buffer memory 9061.

The DMA controller 9020 receives addresses of the transfer source and transfer destination from the microcomputer 9010 and transfers data between the buffer memory 9061 and other units in the level of hardware.

The input interface unit 9030, being achieved by an SCSI interface or the like and connecting the external host apparatus 9900 to the optical disc recording system 9000, has a function of transferring a data transfer notification from the external host apparatus 9900 to the microcomputer 9010. The input interface unit 9030, including a FIFO buffer 9031 for storing a certain amount of data which makes up the original data, receives the original data from the external host apparatus 9900.

The scramble unit 9040 subjects the original data to the scramble.

The term "scramble" used here indicates arranging data elements of the data sequence on a pseudo random basis. That is, the scramble is a process performed to prevent the amount of information on amplitude change points from decreasing by setting the same probability of occurrence for data "1" and data "0." With this process, it is possible for the optical disc playback side to prevent occurrence of a problem that the playback side which reads the data sequences from the optical disc fails to extract the timing elements from the data sequences and fails to play back the data sequences. It should be noted here that in a data transmitting/receiving system, the transmitting side subjects the data sequences to the scramble before transmission so that the receiving side surely receives the data sequences.

The EDC generation unit 9050 generates error-detecting codes corresponding to the original data.

The ECC generator 9070 generates error-correcting codes corresponding to data (see FIG. 3).

The modulating unit 9080 modulates data digitally. The optical disc recording unit 9090 records data onto the optical disc by irradiating laser rays onto the optical disc from the laser light source.

The buffer memory 9061 is a RAM for storing the headers, original data, error-detecting codes, and error-correcting codes. The buffer interface unit 9060 controls reading and writing of data from and into the buffer memory 9061.

The operation of a conventional optical disc recording system is described below with reference to FIGS. 4 and 5.

FIG. 4 is a flowchart showing the operation of a conventional optical disc recording system 9000.

FIG. 5 is a flow diagram showing data flow in the conventional optical disc recording system 9000 in which error-detecting codes are finally stored in the buffer memory 9061.

Note that FIG. 5 shows data being transferred in unit of one data sector.

In the optical disc recording system 9000, the FIFO buffer 9031 in the input interface unit 9030 receives the original data from the external host apparatus 9900 (①  in FIG. 5). On receiving information on the address setting and the like from the microcomputer 9010, the DMA controller 9020 transfers the original data from the FIFO buffer to the buffer memory 9061 (step S9101, ② in FIG. 5). After this step, the buffer memory 9061 stores data which is the content of the data field.

After the content of the data field is stored in the buffer memory 9061, the microcomputer 9010 generates the header field (see FIG. 2), and writes the created header field into the buffer memory 9061 (step S9102, ③ in FIG. 5). After this step, the buffer memory 9061 stores the header field.

After the header field is stored in the buffer memory 9061, the microcomputer 9010 sets addresses and the like in the DMA controller 9020. The DMA controller 9020 then transfers the data field from the buffer memory 9061 to the EDC generation unit 9050 (④ in FIG. 5). The EDC generation unit 9050 then generates error-detecting codes based on the data field. The DMA controller 9020 then transfers the error-detecting codes from the EDC generation unit 9050 to the buffer memory 9061 (step S9103, ⑤ in FIG. 5).

After the error-detecting codes are stored in the buffer memory 9061, the scramble unit 9040 subjects the data field stored in the buffer memory 9061 to the scramble (step S9104). The ECC generator generates error-correcting codes for the header field, data field, and error-detecting codes and stores the generated error-correcting codes in the buffer memory 9061 (step S9105).

It should be noted here that a set of two kinds of error-correcting codes is attached to every set of 16 data sectors (see FIG. 3). That is, steps S9101 to S9104 are performed for each data sector and step S9105 is performed for each set of 16 data sectors.

After the above processes, the optical disc recording system 9000 transfers data from the buffer memory 9061 to the modulating unit 9080, in which the data is modulated. The optical disc recording system 9000 then allows the optical disc recording unit 9090 to record the modulated data onto the optical disc.

As described above, the conventional optical disc recording system 9000 adds information such as error-detecting codes to the original data, as a preparation to modulation and recording processes.

However, in the conventional example shown above, the data field composed of 2,048 bytes of data, being a target of error detection, is read out from the buffer memory 9061 and sent to the EDC generation unit 9050 so that error-detecting codes are generated. This requires a considerable time for accessing the buffer memory 9061. This causes a delay in the entire processing.

DISCLOSURE OF THE INVENTION

It is therefore an object of the present invention to provide an error-detecting information adding apparatus which generates error-detecting codes without reading out the original data from a buffer memory and adds the generated error-detecting codes to the original data.

The above object is achieved by an error-detecting information adding apparatus which generates an error-detecting code based on data and adds the generated error-detecting code to the data, the apparatus includes a memory; a data receiving means, which includes a first input and a first output, for generating the error-detecting code based on data provided as an input to the first input, and provides as an output the generated error-detecting code from the first output; a scramble unit that includes a pseudo random data generation unit for sequentially generating pseudo random data; a second input; and a second output, which provides an output from the second output a result of an execution of an exclusive OR function executed with the pseudo random data generated by the pseudo random data generation unit and with original data provided as an input to the second input; a first data bus connected to the data receiving unit, the first input, and the second input; a selection for connecting either of the first output and the second output to the memory; and a data transfer unit for connecting the second output to the memory and transfers the original data from the data receiving unit to the memory via the scramble unit while the second output is connected to the memory, and simultaneously transferring the original data from the data receiving unit to the first input of the error-detecting code generating unit, and immediately after the transfer of the original data to the memory, controls the selection unit to connect the first output unit to the memory and transfers the error-detecting code from the first output to the memory while the first output is connected to the memory.

With the above-stated construction, it is possible to generate the error-detecting code without reading the original data stored in a buffer memory. This reduces the time required for accessing the buffer memory and the data processing speed is increased as a whole. Also, the original data having been subjected to the scramble and the error-detecting code can be stored in the buffer memory in sequence at a high speed.

The above error-detecting information adding apparatus may further include a header information storage means for storing header information which is to be added to the original data; a header information generating means for generating the header information and writing the generated header information into the header information storage means, wherein the data transfer means further transfers the header information generated by the header information generating means from the header information storage means to the memory and to the error-detecting code generating means before transferring the original data, and when transferring the header information to the memory, the data transfer means transfers the header information to the memory at a place related to a place where the original data is stored.

With the above-stated construction, it is possible to add the header information to each piece of original data received from an external data supply source, where the header information is used for identifying each piece of original data. This relieves the external data supply source of generating the header information previously and sending it with the original data, taking a load off the external data supply source. Also, when the error-detecting code corresponding to a set of the header information and the original data is generated, the header information and the original data are supplied to the error-detecting code generating means while they are transferred to the buffer memory. This eliminates the necessity of reading the header information from the buffer memory and increases the processing speed.

In the above error-detecting information adding apparatus, the data transfer means may include: a DMA controller, wherein an address specifying a location in the memory is set in the DMA controller as information indicating a destination of a DMA transfer, and the DMA controller performs a control so that a transfer of the header information, a transfer of the original data, and a transfer of the error-detecting code are continuously performed in the order in one DMA transfer, and the header information, the original data, and the error-detecting code are stored in the memory in the order starting from the location specified by the address set in the DMA controller.

With the above-stated construction in which the header information and the original data are sequentially transferred in a batch, a microcomputer or the like needs to set the buffer memory address into the DMA controller only once for a set of the header information and the original data. This takes a load off the microcomputer or the like of managing buffer memory addresses. Also, the memory is accessed at high-speed since the header information and the original data are sequentially transferred to the buffer memory being a dynamic RAM at consecutive addresses.

In the above error-detecting information adding apparatus, the original data may include a predetermined number of pieces of data, the data supply source continuously supplies a plurality of pieces of original data, the header information includes an ID code which is used for identifying the original data, the header information generating means includes an addition unit for incrementing a value, and sequentially generates a plurality of pieces of header information while allowing the addition unit to sequentially increment the ID so that the ID codes included in the plurality of pieces of header information are different and correspond to the plurality of pieces of original data, and the data transfer means performs a transfer of a piece of header information, a transfer of a piece of original data, and a transfer of an error-detecting code continuously in the order in one DMA transfer for each of the plurality of pieces of original data.

With the above-stated construction, it is possible to add different ID codes to a plurality of pieces of original data without difficulty.

In the above error-detecting information adding apparatus, the first data bus may be further connected to the header information storage unit, the scramble unit provides as an output the header information from the second output when the header information has been provided as an input to the second input, and executes an exclusive OR function with the pseudo random data generated by the pseudo random data generation unit and with the original data and provides as an output from the second output a result of the execution of the exclusive OR function when the original data has been provided as an input to the second input unit, and the data transfer unit controls the selection unit to connect the second output to the memory and transfers the header information and the original data from the data receiving unit to the memory via the scramble unit while the second output is connected to the memory.

With the above-stated construction, it is possible to generate the error-detecting code based on the header information and the original data which has not been subjected to the scramble. It is also possible to subject the original data to the scramble. It is further possible to transfer the error-detecting code to the buffer memory at a place adjacent to the stored original data since the error-detecting code generating means is connected to the buffer memory after the original data is transferred to the buffer memory. As a result, the original data having been subjected to the scramble and the error-detecting code can be stored in the buffer memory in sequence at a high speed.

In the above apparatus, the pseudo random data generation unit may sequentially generate the pseudo random data when receiving an initial value, the scramble means further includes: a table ROM unit which includes: a table unit for storing a plurality of initial values, the table ROM unit, when the header information has been input to the second input unit, sends one of the plurality of initial values stored in the table unit to the pseudo random data generation unit based on a part of or a whole of the header information.

With the above-stated construction, it is possible to identify, from a value in the header information, an initial value which is a seed used to generate the pseudo random data. This makes it possible to recognize the scramble performed onto the original data only by referring to the header information corresponding to the original data. As a result, for example, it is possible for an optical disc reproduction apparatus in an optical disc recording system using the error-detecting information adding apparatus to obtain the original data only by referring to the header information to subject the original data having been subjected to the scramble to the descramble.

In the above apparatus, the scramble means may include: an initial value selecting unit for, when the header information has been input to the second input unit, selecting either of: sending a part of or a whole of the header information to the pseudo random data generation unit as an initial value; and instructing the table ROM unit to send one of the plurality of initial values stored in the table unit to the pseudo random data generation unit based on a part of or a whole of the header information.

With above-described construction, it is possible to selectively support two data formats: (1) a data format in which the value in the header information is the initial value being a seed used to generate the pseudo random data; and (2) a data format in which the value in the header information indirectly specifies the initial value being a seed used to generate the pseudo random data.

DESCRIPTION OF THE PREFERRED EMBODIMENTS

Embodiment

An embodiment of the present invention, an error-detecting information adding apparatus, is described below.

<Construction>

Figure 6:
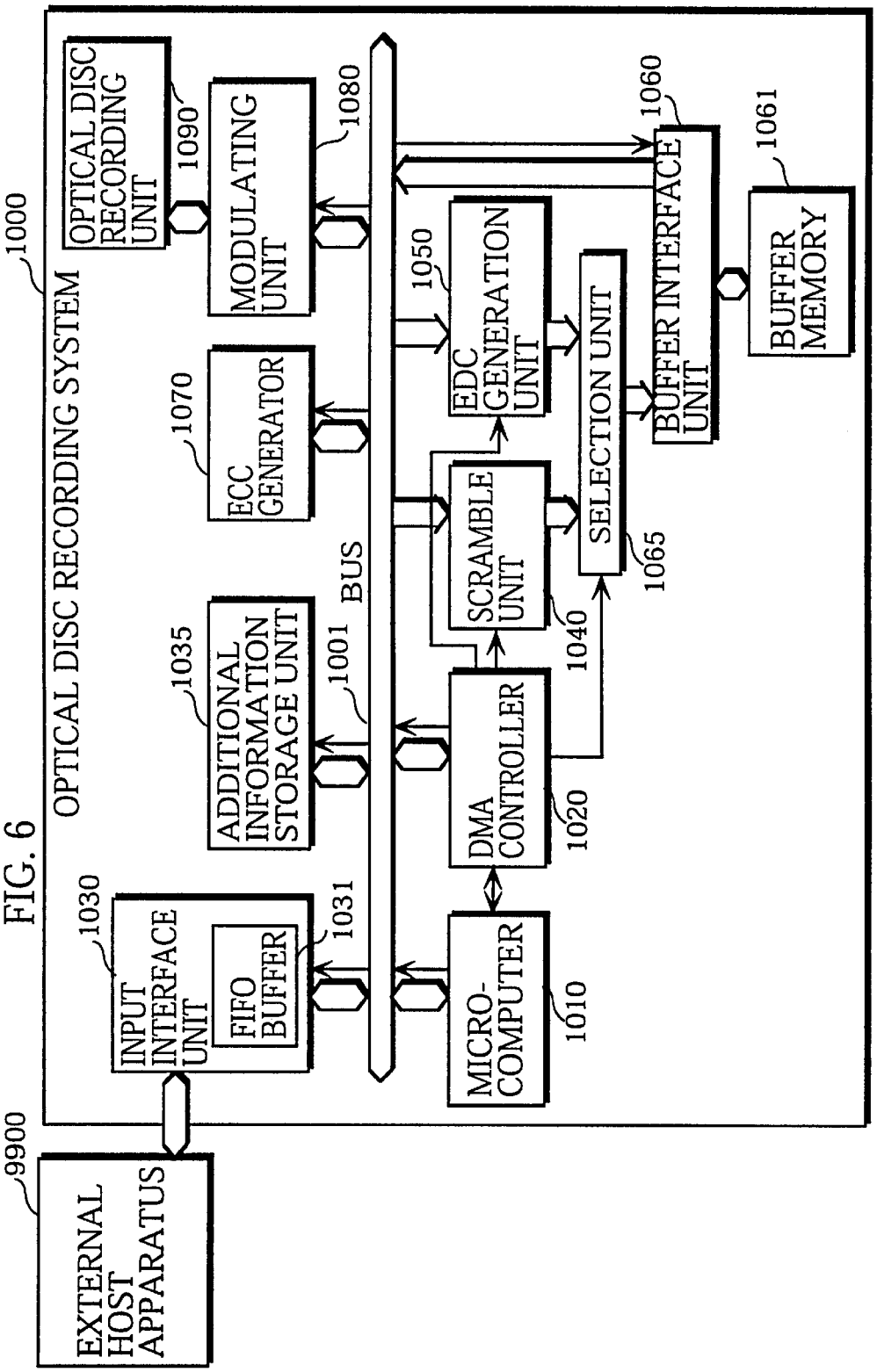
FIG. 6 shows the construction of an optical disc recording system 1000 which is an embodiment of the present invention.

FIG. 6 shows the construction of an optical disc recording system 1000 which is an embodiment of the present invention.

The optical disc recording system 1000 receives a plurality of pieces of original data from an external host apparatus 9900, adds headers, error-detecting codes, and error-correcting codes to the received data, modulates the data, and writes the modulated data onto the DVD. The optical disc recording system 1000 includes a bus 1001, a microcomputer 1010, a DMA controller 1020, an input interface unit 1030, an additional information storage unit 1035, a scramble unit 1040, an EDC generation unit 1050, a buffer interface unit 1060, a buffer memory 1061, a selection unit 1065, an ECC generator 1070, a modulating unit 1080, and an optical disc recording unit 1090.

Figure 1:
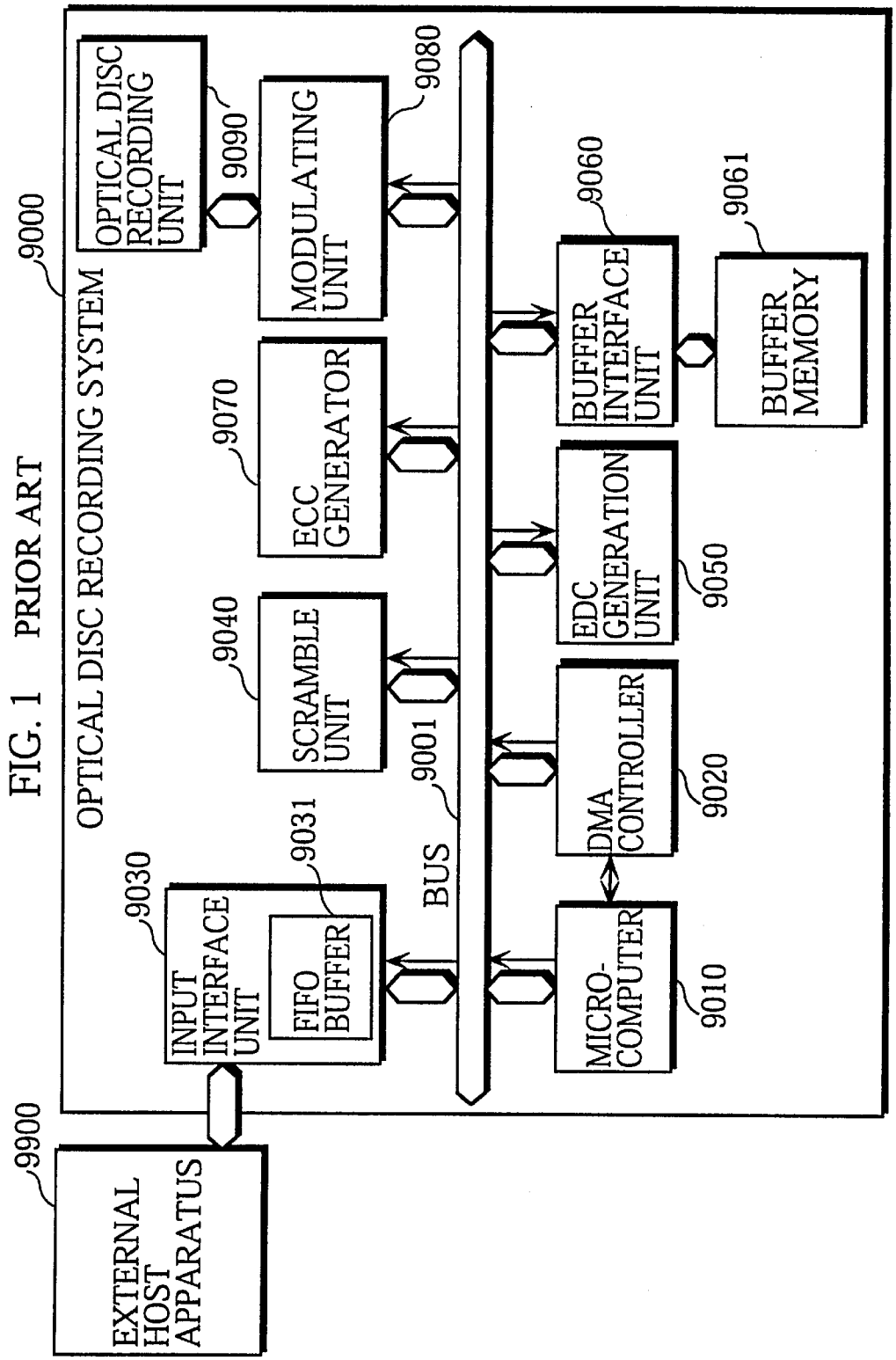
FIG. 1 shows a construction of a conventional optical disc recording system 9000.
Figure 2:
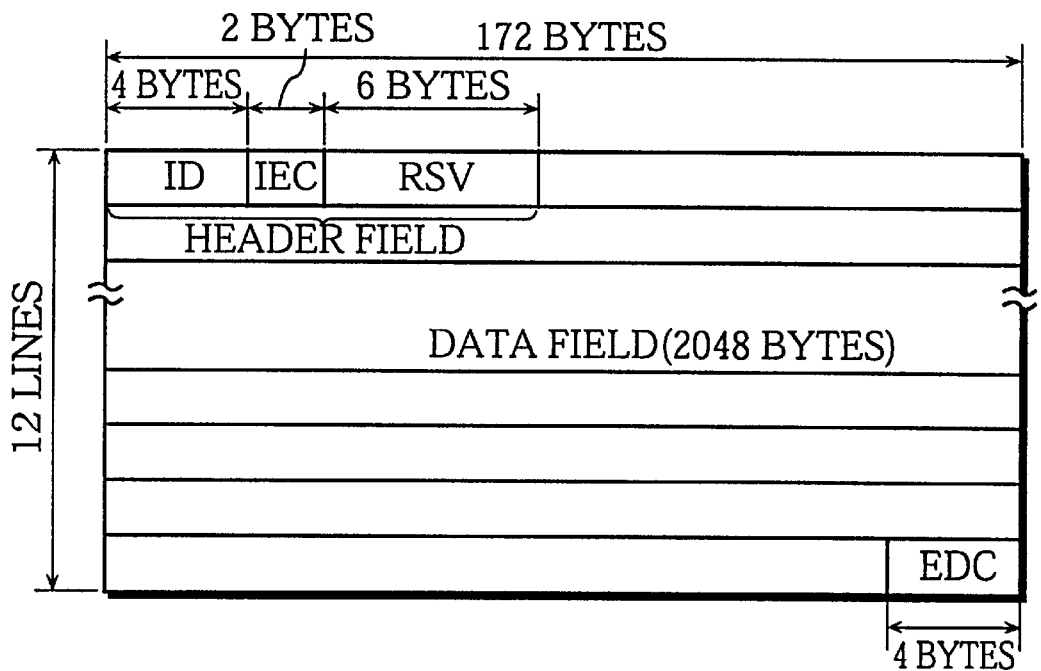
FIG. 2 shows a configuration of the data sector.
Figure 3:
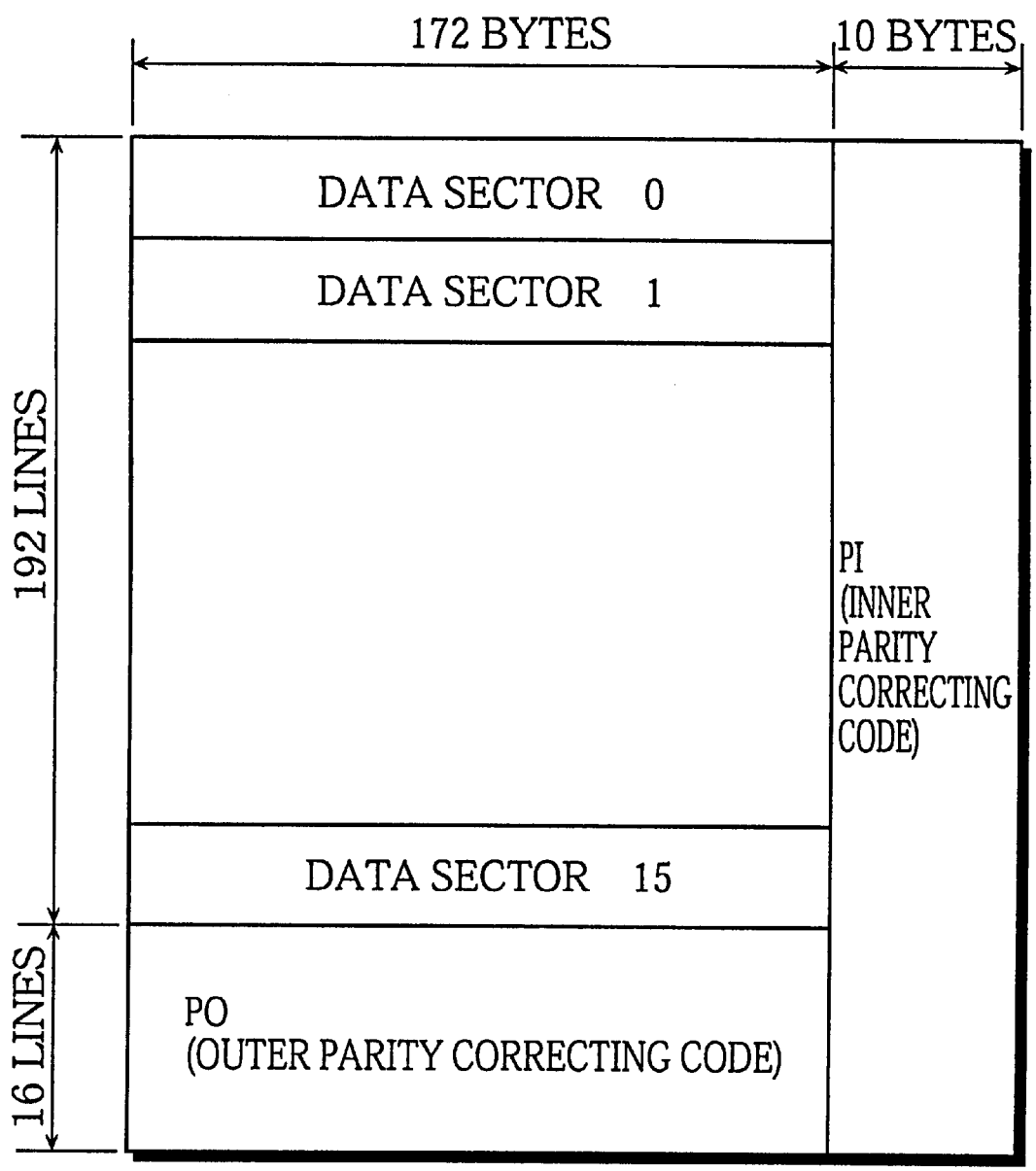
FIG. 3 shows a configuration of the ECC block.
Figure 4:
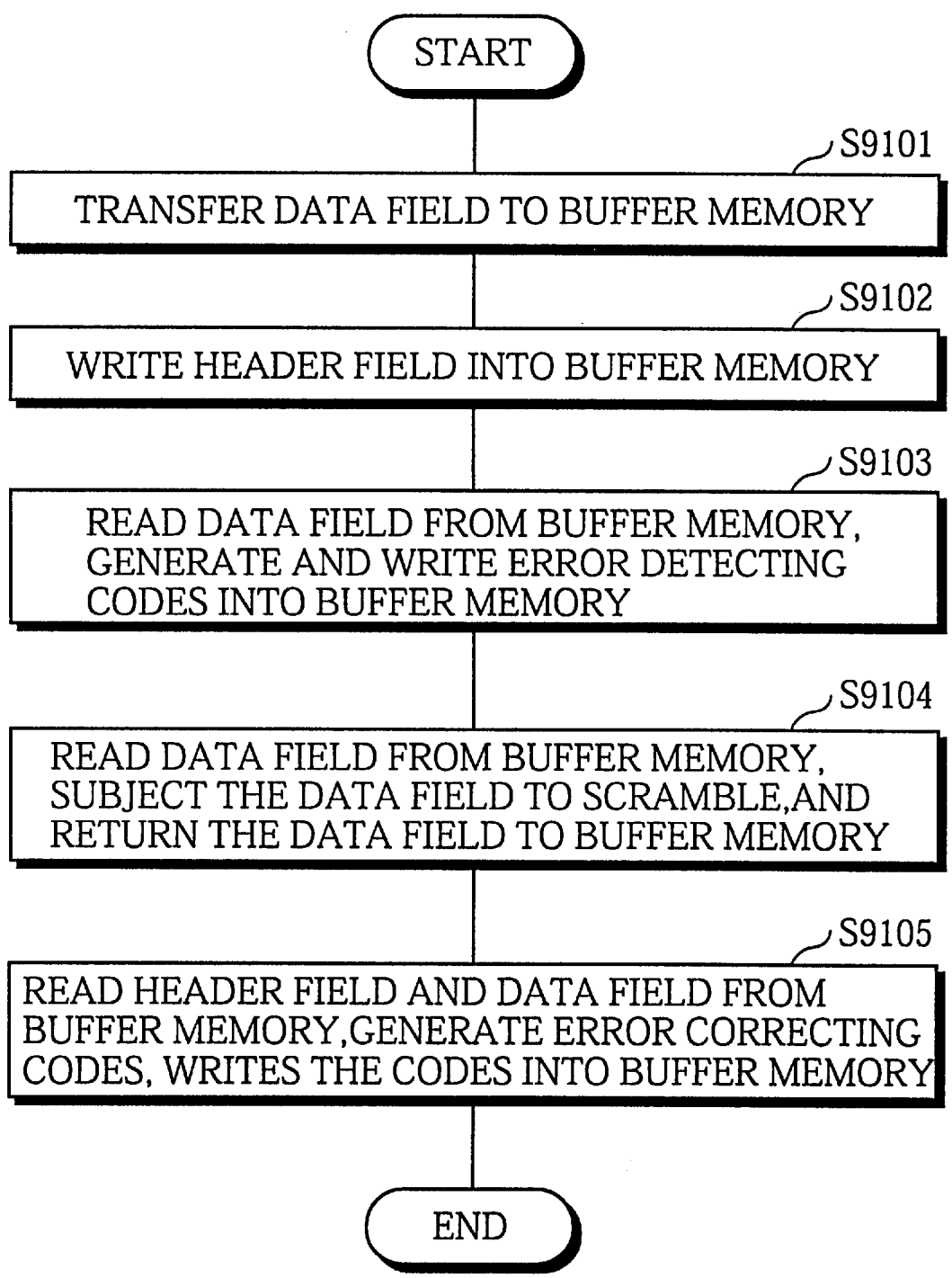
FIG. 4 is a flowchart showing the operation of a conventional optical disc recording system 9000.
Figure 5:
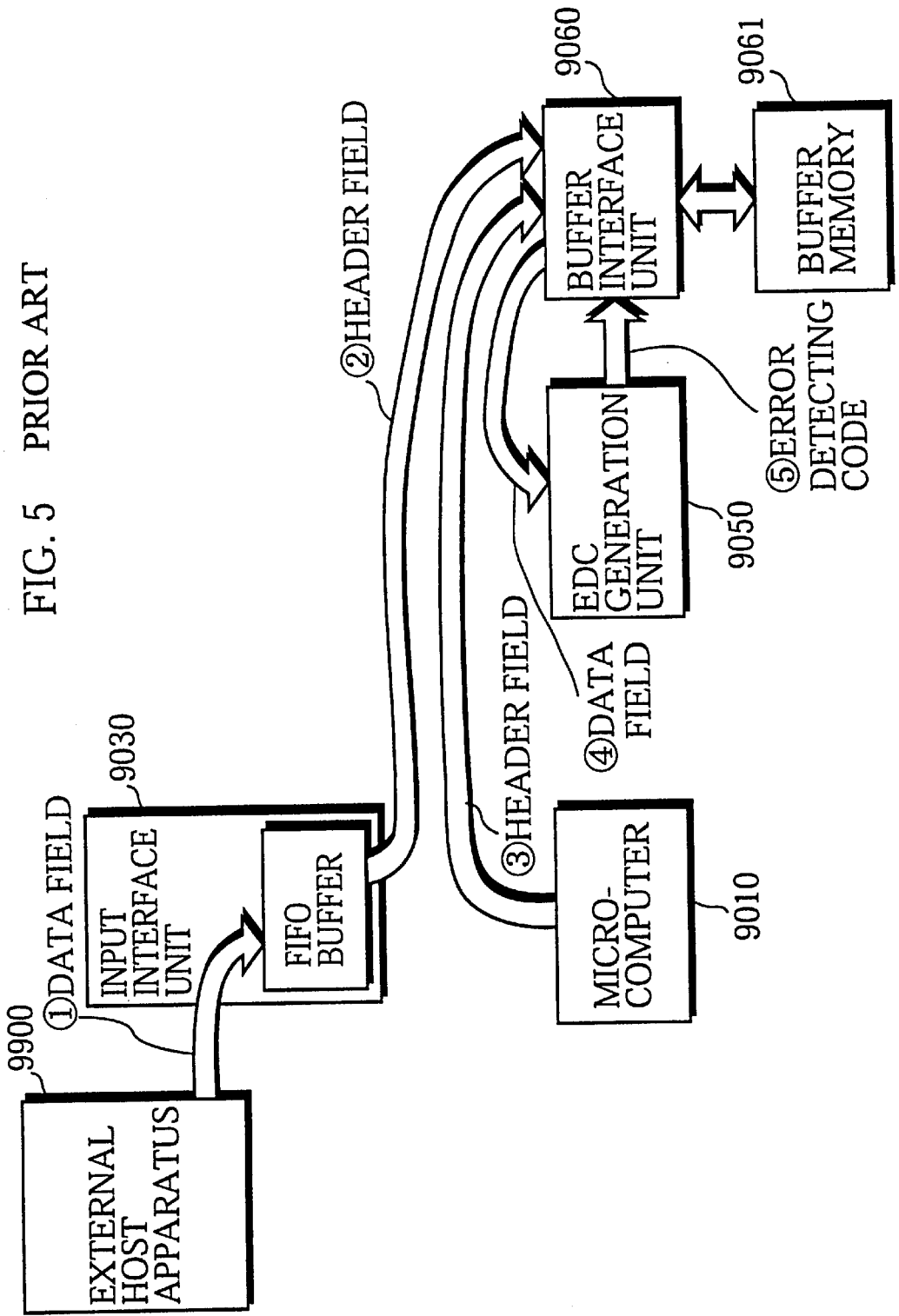
FIG. 5 is a flow diagram showing data flow in the conventional optical disc recording system 9000 in which error-detecting codes are finally stored in the buffer memory 9061.

The information such as the headers to be recorded onto the optical disc is equivalent to that shown in FIGS. 2 and 3.

The additional information storage unit 1035 is a memory for storing the header fields and has a small capacity enough to store them.

The microcomputer 1010, including a microprocessor and a ROM storing a program to be executed, controls the entire operation of the optical disc recording system 1000 by receiving data transfer notifications from the external host apparatus 9900. The microcomputer 1010 also generates header fields to be attached to the original data and writes the generated header fields into the additional information storage unit 1035.

The DMA controller 1020 receives from the microcomputer 1010: addresses of the transfer source and transfer destination; and a number of pieces of data to be transferred, and transfers data between the buffer memory 1061 and other units in the level of hardware in accordance with the received addresses and the number of pieces of data. The DMA controller 1020 also has a function to notify the scramble unit 1040 and selection unit 1065 of the start and end of data transfer for each data sector.

The input interface unit 1030, being achieved by an SCSI interface or the like and connecting the external host apparatus 9900 to the optical disc recording system 1000, has a function of transferring a data transfer notification from the external host apparatus 9900 to the microcomputer 1010. The input interface unit 1030, including a FIFO buffer 1031 for storing a certain amount of data which makes up the original data, receives the original data from the external host apparatus 9900. The FIFO buffer 1031 is a memory having a smaller capacity than the buffer memory 1061.

The scramble unit 1040 subjects the original data to the scramble in which the scramble unit 1040 generates pseudo random data, and executes an exclusive OR function with the generated pseudo random data and data making up the original data. The construction and operation of the scramble unit 1040 will be described later in detail.

The EDC generation unit 1050 generates error-detecting codes corresponding to the original data, and outputs the generated error-detecting codes. The EDC generation unit 1050 obtains the error-detecting codes from remainders of divisions of code-polynomials by certain generator polynomials, where input data is used as coefficients for the code-polynomials.

The ECC generator 1070 generates error-correcting codes corresponding to data (see FIG. 3). It should be noted here that the outer parity shown in FIG. 3 is added to a set of 16 data sectors by referring to a part of each of the 16 data sectors. Consequently, the ECC generator 1070 requires 16 data sectors to generate the outer parity. As a result, the data sectors should be stored in the buffer memory 1061 before the generation of the error-correcting codes.

The modulating unit 1080 modulates data digitally. The optical disc recording unit 1090 records data onto the optical disc by irradiating laser rays onto the optical disc from the laser light source.

The buffer memory 1061 is a dynamic RAM for storing the headers, original data, error-detecting codes, and error-correcting codes. The buffer memory 1061 has at least a capacity corresponding to the size of one ECC block (see FIG. 3).

The buffer interface unit 1060 controls reading and writing of data from and into the buffer memory 1061, and is connected to the selection unit 1065 via a bus.

The selection unit 1065 selects either of the output of the scramble unit 1040 and the output of the EDC generation unit 1050 in accordance with a notification sent from the DMA controller 1020, and inputs the selected output into the buffer interface unit 1060.

<Operation>

The operation of the optical disc recording system 1000 having the above-mentioned construction is described below.

Figure 7:
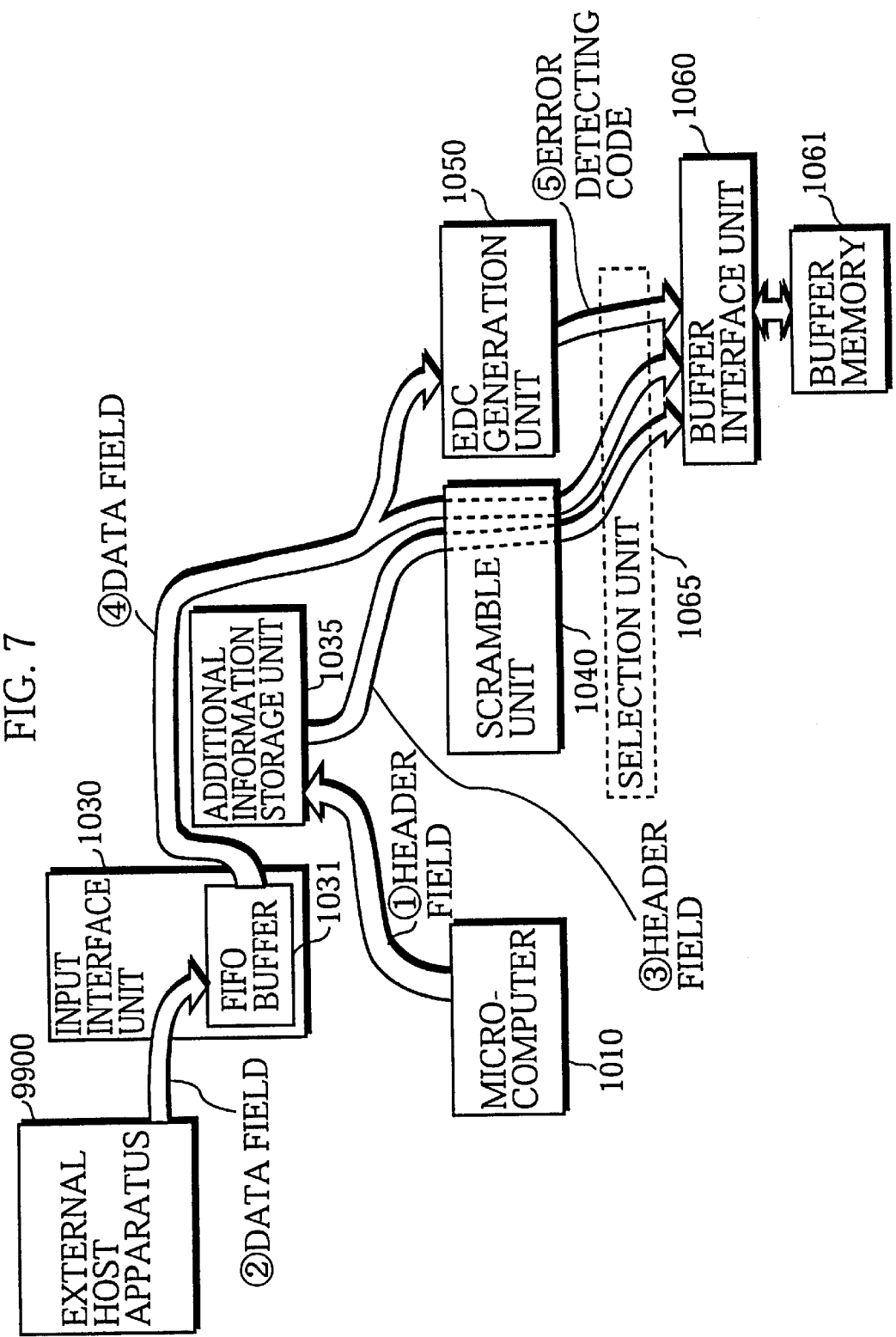
FIG. 7 is a flow diagram showing data flow in the optical disc recording system 1000 in which error-detecting codes are finally stored in the buffer memory 1061.

The outline of the operation is described first with reference to FIG. 7.

FIG. 7 is a flow diagram showing data flow in the optical disc recording system 1000 in which error-detecting codes are finally stored in the buffer memory 1061.

Note that FIG. 7 shows data being transferred in unit of one data sector.

In the optical disc recording system 1000, on receiving a data transfer notification from the external host apparatus 9900, the microcomputer 1010 generates the header field and stores the generated header field into the additional information storage unit 1035 (① in FIG. 7).

In parallel with the creation of the header field by the microcomputer 1010, the external host apparatus 9900 transfers the original data to the FIFO buffer 1031 of the input interface unit 1030 (② in FIG. 7).

After the header field is stored in the additional information storage unit 1035, the microcomputer 1010 sets addresses and the like in the DMA controller 1020. The DMA controller 1020 then transfers the header field from the additional information storage unit 1035 to the buffer memory 1061 via the scramble unit 1040 (③ in FIG. 7). The DMA controller 1020 then transfers the data field from the FIFO buffer 1031 to the buffer memory 1061 and also transfers the data field to the EDC generation unit 1050 (④ in FIG. 7).

After storing the data field in the buffer memory 1061, the DMA controller instructs the selection unit 1065 to switch to a connection between the EDC generation unit 1050 and the buffer interface unit 1060, and transfers the error-detecting codes from the EDC generation unit 1050 to the buffer memory 1061 (⑤ in FIG. 7).

The above-mentioned operation is detailed below with reference to FIGS. 8–11.

The entire control performed by the microcomputer 1010 is described first.

Figure 8:
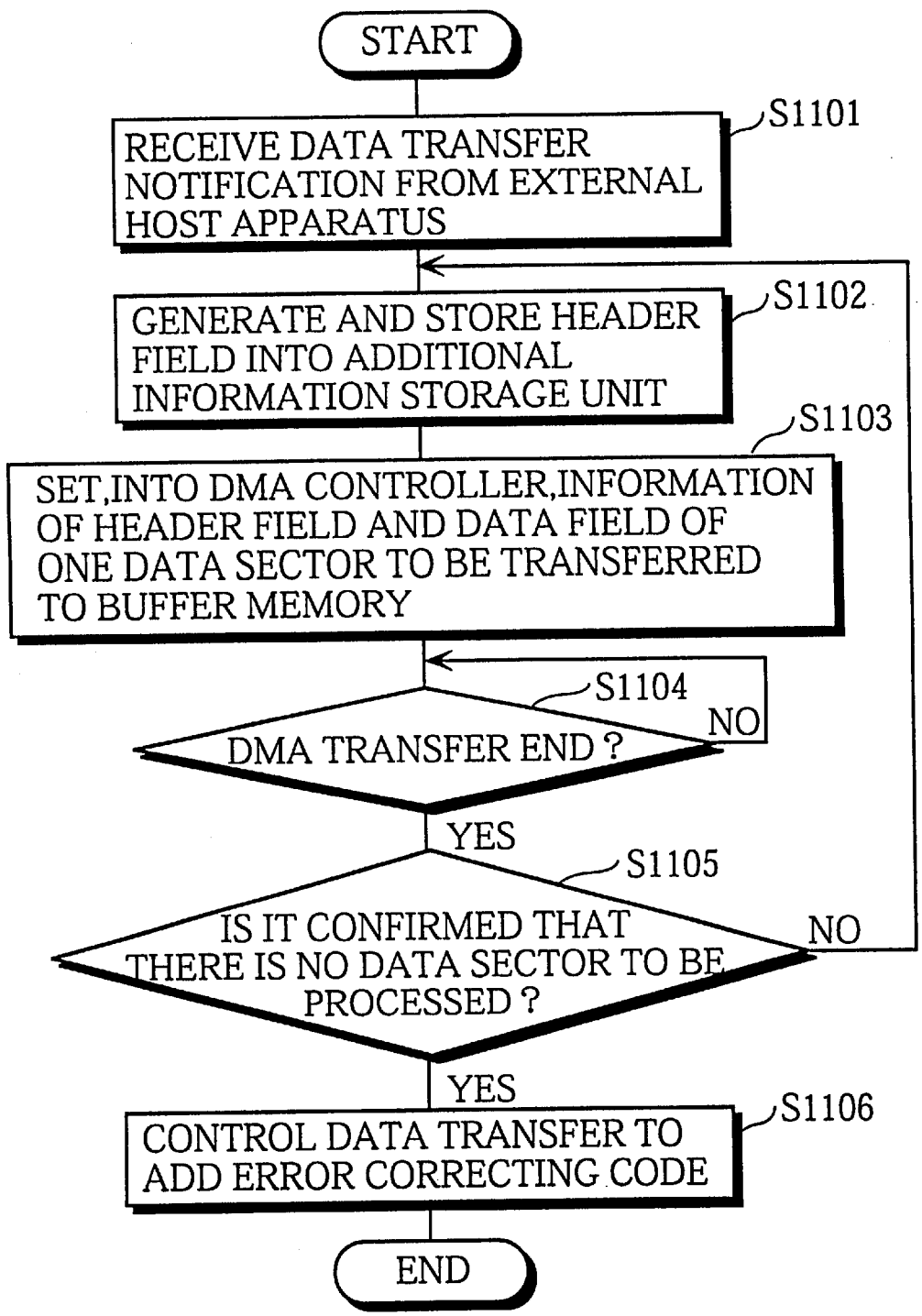
FIG. 8 is a flowchart showing the operation of the microcomputer 1010.

FIG. 8 is a flowchart showing the operation of the microcomputer 1010.

The microcomputer 1010 receives a data transfer notification from the external host apparatus 9900 via the input interface unit 1030, the data transfer notification including a size of the data to be transferred and a start address which is used as a base to generate the header fields (step S1101).

The microcomputer 1010 generates an ID code being an address of a data sector based on the information sent from the external host apparatus 9900, generates an ID-code-related error-correcting code (IEC), generates data to be stored in the reserve area, and stores the header field (see FIG. 2) composed of the generated ID code, IEC, and data of the reserve area into the additional information storage unit 1035 (step S1102). For example, on receiving a start address "100" of the transfer-target data from the external host apparatus 9900, the microcomputer 1010 generates the ID code of the first data sector by a vale indicating the address "100," generates the ID code of the second data sector by a value indicating the address "101," generates the ID code of the third data sector by a value indicating the address "102." The microcomputer 1010 also generates, using a predetermined generation formula, error-correcting codes corresponding to the ID codes.

After the header field is stored in the additional information storage unit 1035, the microcomputer 1010 sets into the DMA controller 1020 the size and address information of the header field and data field of one data sector to be transferred to the buffer memory 1061 (step S1103).

For achieving the above process, the microcomputer 1010 manages the addresses of the areas in the buffer memory 1061 where the data sectors are stored, and recognizes each address in the buffer memory 1061 where each of the header field, data field, and error-correcting code of one transferred data sector is stored. With this arrangement, the DMA controller 1020 starts a DMA transfer by controlling the FIFO buffer 1031, additional information storage unit 1035, scramble unit 1040, buffer interface unit 1060, and selection unit 1065.

After receiving a notification from the DMA controller 1020 of a completion of transferring one data sector, the microcomputer 1010 repeats the steps S1102 to S1105 for each of the remaining data sectors requested to be transferred in the data transfer notification sent from the external host apparatus 9900 when a plurality of data sectors are requested to be transferred (step S1105). The microcomputer 1010 then continues to control the data transfer from the buffer memory 1061 to the ECC generator 1070 so that an error-correcting code is added to every set of 16 data sectors transferred from the external host apparatus.

It should be noted here that processes after the storage of data of one data sector into the buffer memory 1061 are not described here since the part is not characteristic of the present invention.

The following is a description of the control performed by the DMA controller 1020 over data transfer of one data sector to the buffer memory 1061.

Figure 9:
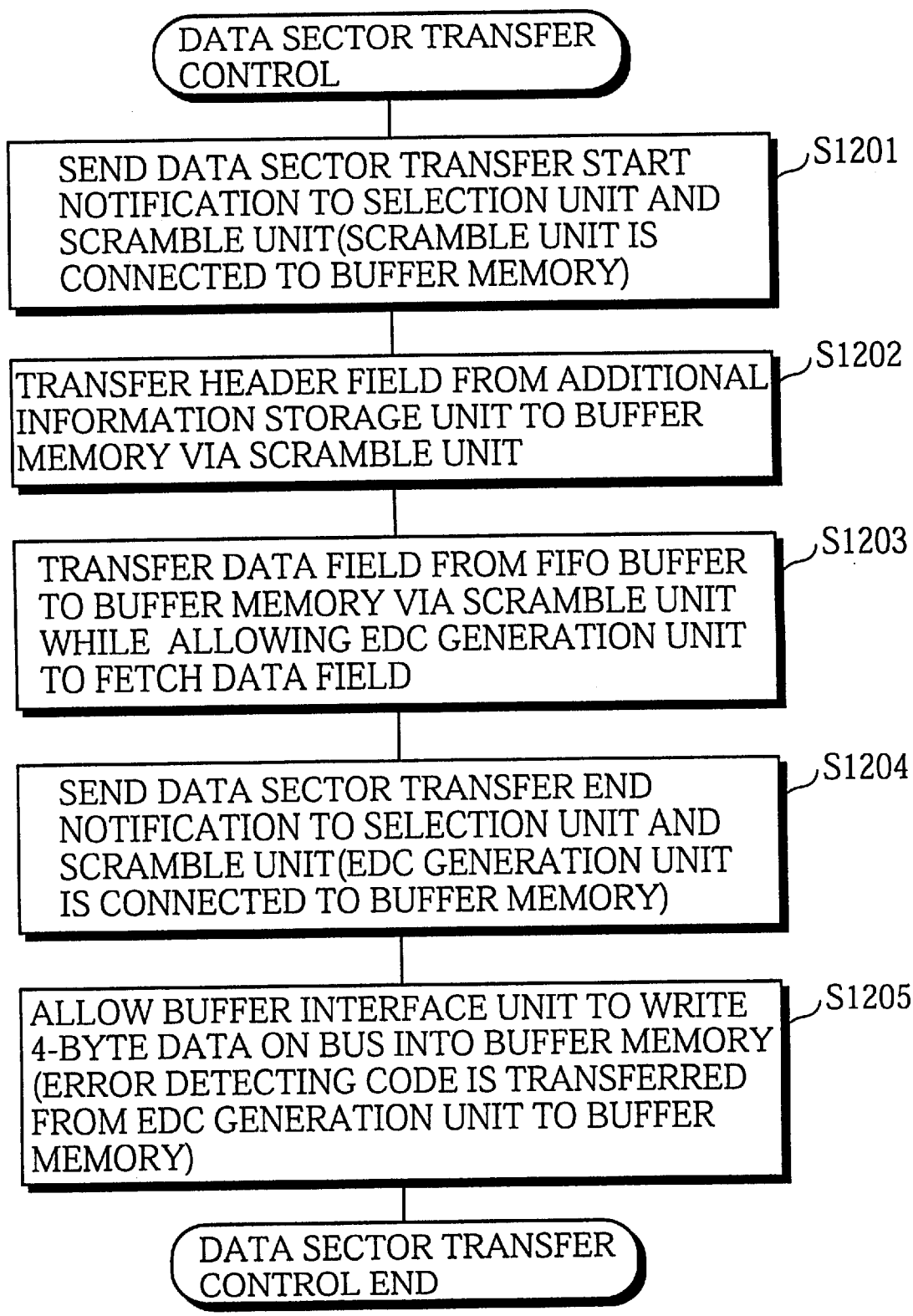
FIG. 9 is a flowchart showing the control performed by the DMA controller 1020 over data transfer of one data sector.

FIG. 9 is a flowchart showing the control performed by the DMA controller 1020 over data transfer of one data sector.

On receiving an instruction to transfer data of one data sector from the microcomputer 1010, the DMA controller 1020 sends a data sector transfer start notification to the scramble unit 10440 and to the selection unit 1065 (step S1201).

The scramble unit 1040 determines the timing for starting subjecting data to the scramble by using the data sector transfer start notification sent from the DMA controller 1020. For example, the scramble unit 1040 adjusts the timing not to subject the header field to the scramble and to subject the data field to the scramble.

On receiving the data sector transfer star notification, the selection unit 1065 connects the scramble unit 1040 to the buffer interface unit 1060.

After sending the data sector transfer start notification, the DMA controller 1020 controls units so that the header field is transferred from the additional information storage unit 1035 to the buffer memory 1061 via the scramble unit 1040 and the selection unit 1065 (step S1202).

In doing the above process, the DMA controller 1020, based on a certain clock, instructs the additional information storage unit 1035 to output data onto a bus, and instructs the buffer interface unit 1060 to write the data on the bus into the buffer memory 1061. The DMA controller 1020 operates the same as general-purpose DMA controllers in that it controls the data transfer by alternately assigning a cycle of outputting data onto the bus and a cycle of reading the data from the bus to the transfer source and the transfer destination. It should be noted here that the bus 1001 is a 32-bit bus. Also, the DMA controller 1020 sends a data generation instruction to the scramble unit 1040. This instruction will be described later.

After the 12-byte header field has been transferred, the DMA controller 1020 controls units so that the data field is transferred from the FIFO buffer 1031 to the buffer memory 1061 viz the scramble unit 1040 and the selection unit 1065, and also to the EDC generation unit 1050 (step S1203).

In doing the above process, the DMA controller 102 instructs the FIFO buffer 1031 to output data onto a bus, and instructs the buffer interface unit 1060 to write the data on the bus into the buffer memory 1061. The DMA controller 1020 also instructs the EDC generation unit 1050 to fetch the data from the bus. Note that when instructing the EDC generation unit 1050 to fetch the data from the bus for the first time, the DMA controller 1020 resets the EDC generation unit 1050. Also, the DMA controller 1020 sends a data generation instruction to the scramble unit 1040. This instruction will be described later.

After the 2,048-byte data field has been transferred, the DMA controller 1020 sends a data sector transfer end notification to the scramble unit 1040 and the selection unit 1065 (step S1204).

The scramble unit 1040 determines the timing for ending subjecting data to the scramble by using the data sector transfer end notification sent from the DMA controller 1020.

On receiving the data sector transfer end notification, the selection unit 1065 connects the EDC generation unit 1050 to the buffer interface unit 1060 by replacing the scramble unit 1040 by the EDC generation unit 1050.

After the EDC generation unit 1050 is connected to the buffer interface unit 1060, a 4-byte error-detecting code is transferred from the EDC generation unit 1050 to the buffer memory 1061 (step S1205).

Figure 10:
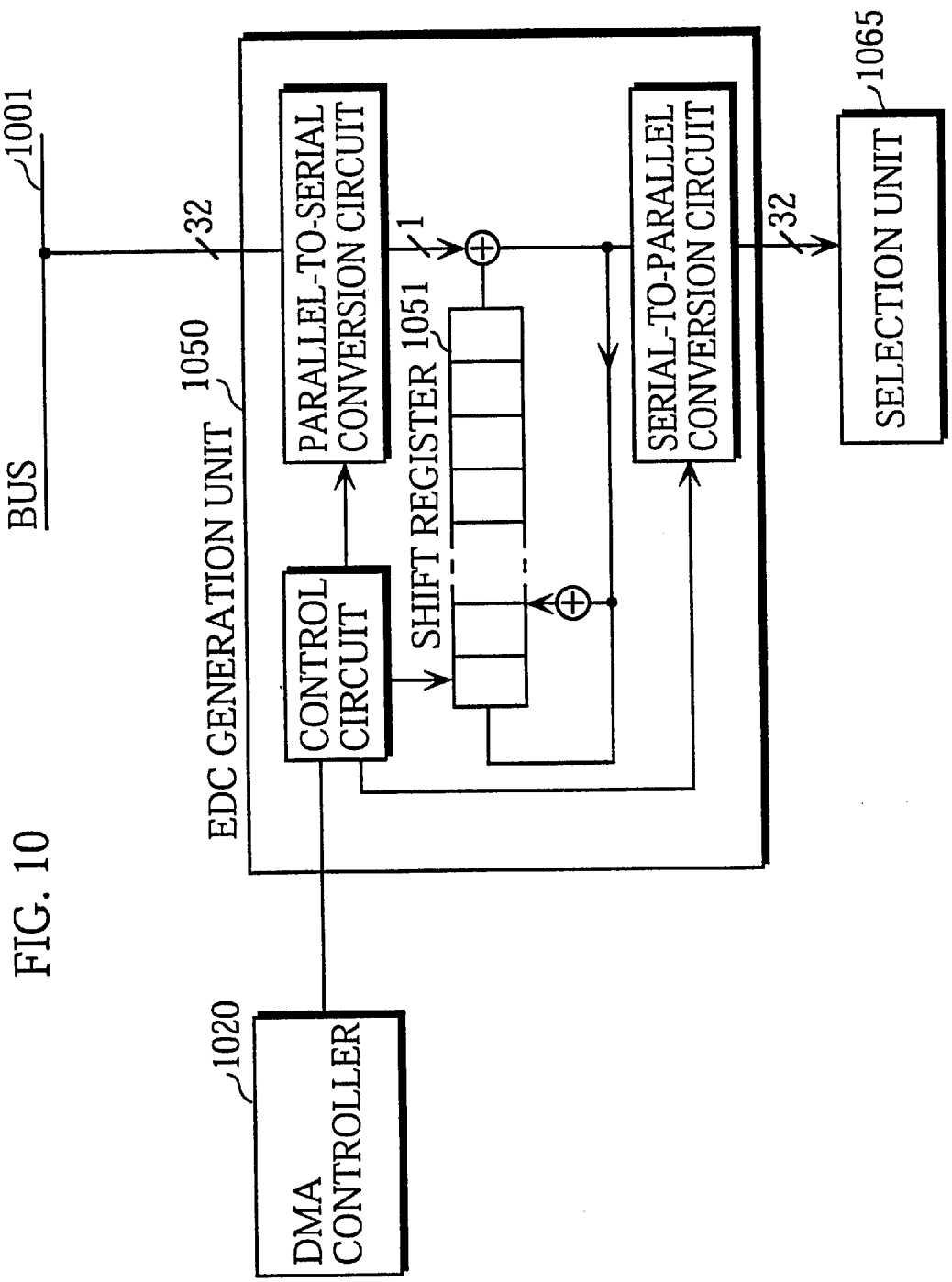
FIG. 10 shows the construction of the EDC generation unit 1050.

FIG. 10 shows the construction of the EDC generation unit 1050.

As shown in the drawing, the EDC generation unit 1050 clears the shift register 1051 when being reset by the DMA controller 1020; the EDC generation unit 1050 fetches the input data by shifting the value in the shift register 1051 when receiving a data fetch instruction. The EDC generation unit 1050 converts data fetched from a 32-bit bus into serial data, inputs the converted serial data into the shift register 1051. The EDC generation unit 1050 also converts the output from the shift register 1051 to parallel data, and outputs the converted parallel data to the 32-bit bus.

The above process is described more specifically. After the EDC generation unit 1050 sequentially fetches the content of the data field, the EDC generation unit 1050 generates an error-detecting code on a bus connecting the unit 1050 to the buffer interface unit 1060, the bus having been selected by the selection unit 1065. As a result, the error-detecting code is transferred to the buffer memory 1061 when the DMA controller instructs the buffer interface unit 1060 to write four bytes (equal to an amount for one transfer since the bus is 32-bit bus) of data on the bus into the buffer memory 1061 after 2,048 bytes of data of the data field is transferred.

After the above processes, the header field, data field and error-detecting code are stored in the buffer memory 1061.

As described above, the optical disc recording system 1000 generates the error-detecting code without reading data from the buffer memory and sending it to the EDC generation unit 1050. As a result, the number of accesses to the buffer memory in the present system is smaller than the conventional system described as an example.

<Scramble Unit>

The following is a description of the scramble unit 1040 which is located on a data-transfer route between the FIFO buffer 1031 and the buffer memory 1061 and on a data-transfer route between the additional information storage unit 1035 and the buffer memory 1061.

Figure 11:
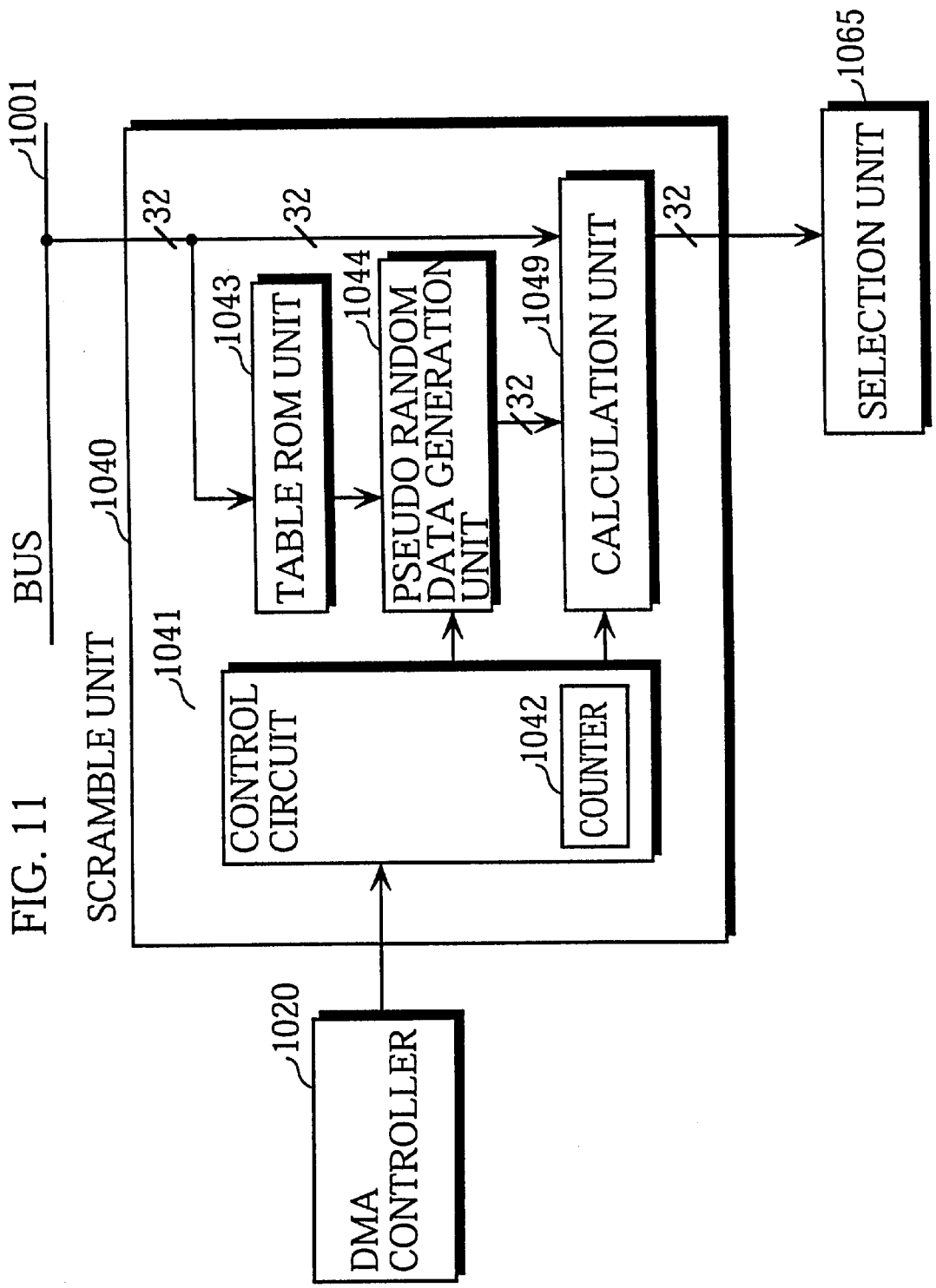
FIG. 11 shows the construction of the scramble unit 1040.

FIG. 11 shows the construction of the scramble unit 1040.

The scramble unit 1040 includes a control unit 1041, a table ROM unit 1043, a pseudo random data generation unit 1044, and a calculation unit 1049.

The control unit 1041, including a counter 1042 which counts up to four, controls the components of the scramble unit 1040 when receiving from the DMA controller 1020 the data sector transfer start notification, the data sector transfer end notification, or the data generation instruction.

Figure 12:
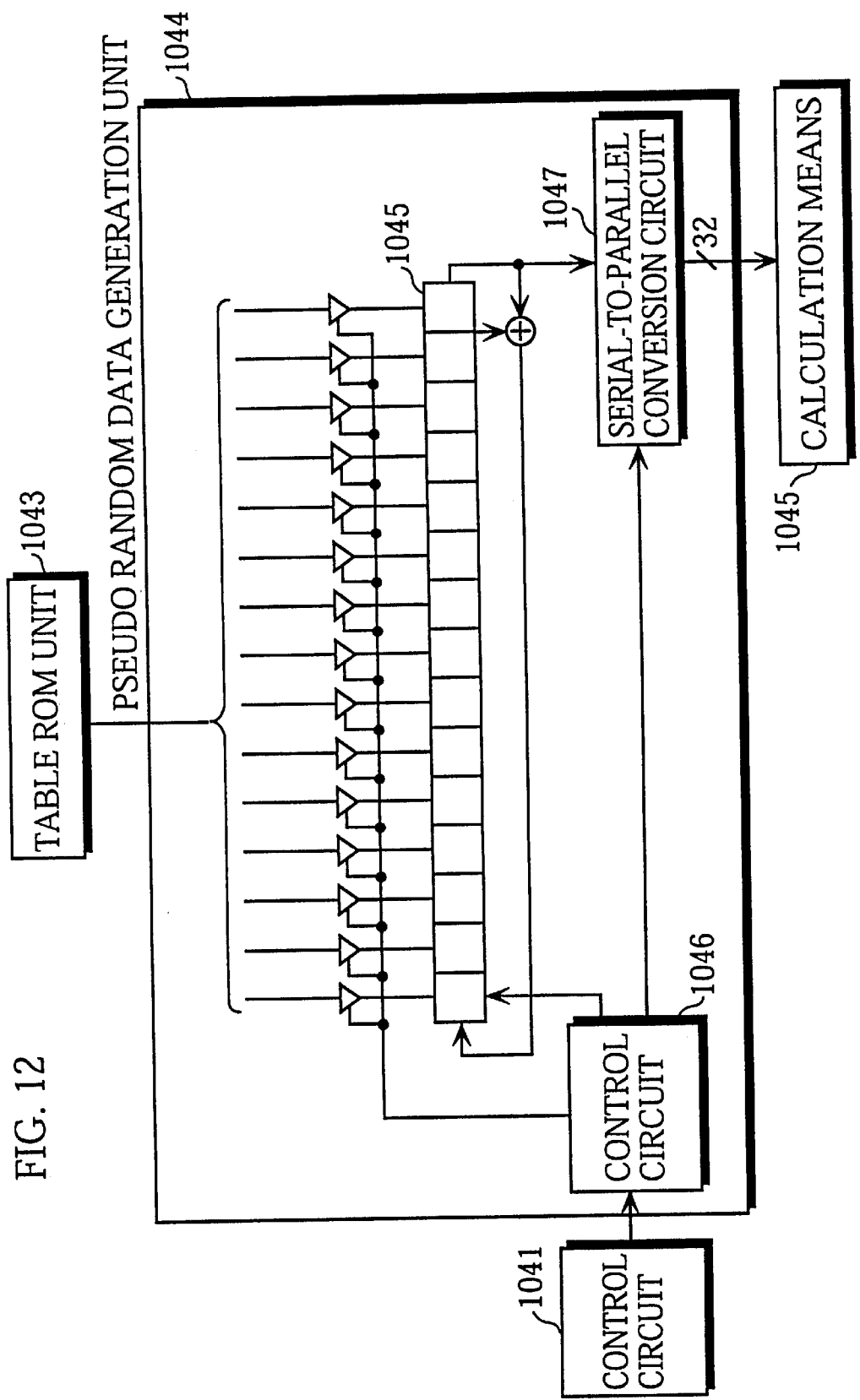
FIG. 12 shows the construction of the pseudo random data generation unit 1044.

FIG. 12 shows the construction of the pseudo random data generation unit 1044.

The pseudo random data generation unit 1044, under control of a control circuit 1046 which is under control of the control unit 1041, sets a linear feedback shift register 1045 to an initial value, where the initial value is selected from the initial values stored in the table ROM unit 1043. The pseudo random data generation unit 1044 also shifts the value in the linear feedback shift register 1045, and controls a serial-to-parallel conversion circuit 1047 so that 32-bit pseudo random data is supplied to the calculation unit 1049.

The table ROM unit 1043 stores 16 types of initial values. One of the 16 types of initial values is output to the pseudo random data generation unit 1044 in accordance with an input value. It should be noted here that among the 32 bit wires of the 32-bit bus connected to the input of the scramble unit 1040, certain four bit wires are also connected to the input of the table ROM unit 1043.

The calculation unit 1049 executes an exclusive OR function with 32-bit pseudo random data output from the pseudo random data generation unit 1044 and 32-bit data to be input to the scramble unit 1040, and outputs the result of the execution of the exclusive OR function.

The operation of the scramble unit 1040 is described below with reference to FIGS. 13 and 14.

Figure 13:
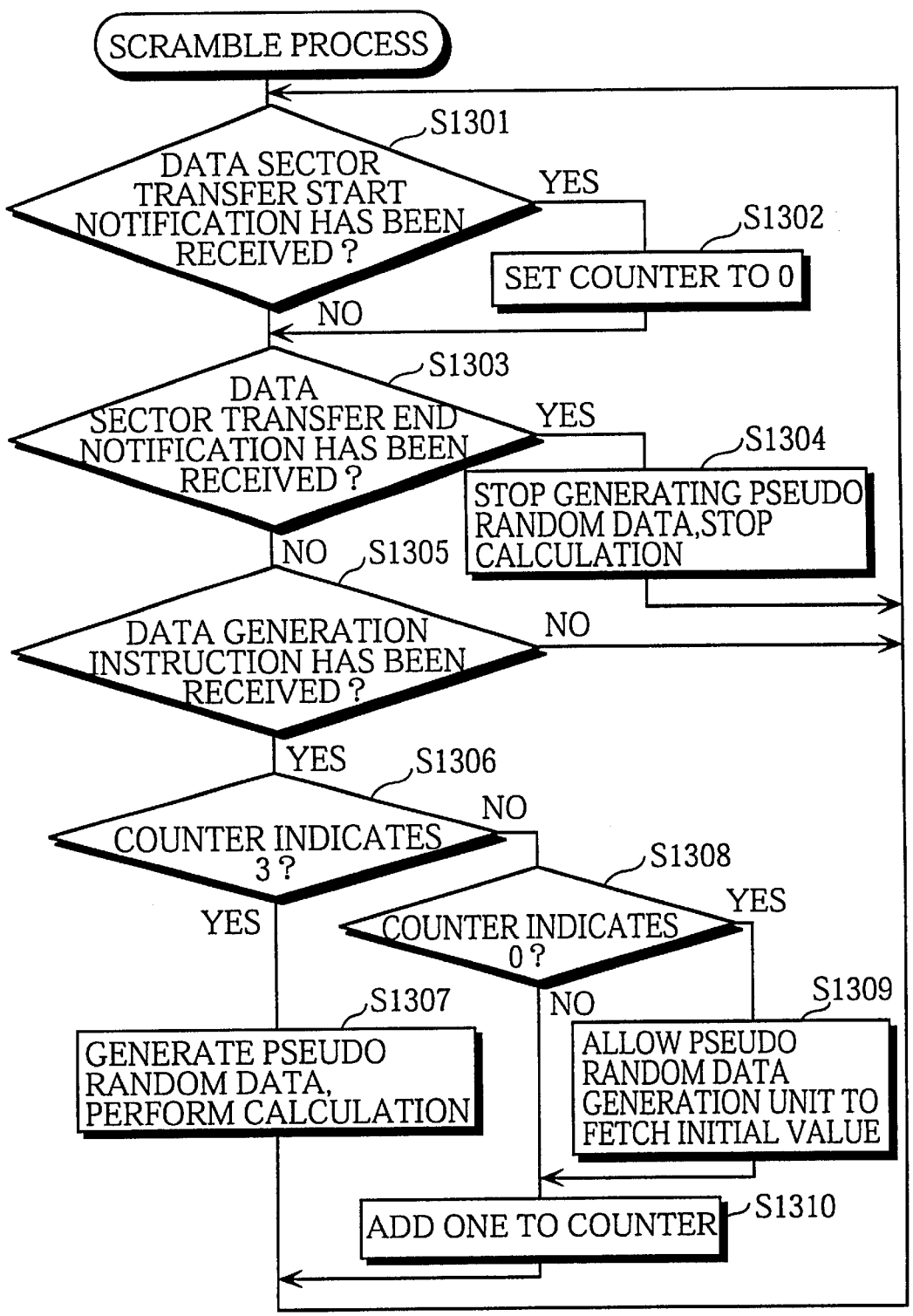
FIG. 13 is a flowchart showing the operation of the scramble unit 1040.

FIG. 13 is a flowchart showing the operation of the scramble unit 1040.

As shown in the drawing, each processing step is executed when it is confirmed through judgment steps that certain corresponding conditions are satisfied.

The control unit 1041 sets the counter 1042 to 0 when it receives the data sector transfer start notification from the DMA controller 1020 (S1301).

When receiving the data sector transfer end notification from the DMA controller 1020, the control unit 1041 instructs the pseudo random data generation unit 1044 to stop generating pseudo random data and prevents the calculation unit 1049 from outputting the calculation result so that the input value and output value of the scramble unit 1040 are the same (S1304).

On receiving the data generation instruction from the DMA controller 1020 (S1305) when the counter 1042 has value "3," the control unit 1041 instructs the pseudo random data generation unit 1044 to generate pseudo random data and instructs the calculation unit 1049 to output the calculation result (S1306, S1307).

On receiving the data generation instruction from t DMA controller 1020 (S1305) when the counter 1042 has value "0" (S1308), the control unit 1041 instructs the pseudo random data generation unit 1044 to fetch an initial value from the table ROM unit 1043 (S1309). This is because certain four bits in the ID code (see FIG. 2) located at the start of the header field are used as the initial value used for generating the pseudo random data.

When the counter 1042 has a value other than "3," one to the value of the counter (S1310).

It should be noted here that the DMA controller 1020 outputs the data generation instruction with the same timing when the DMA controller 1020 repeatedly instructs the additional information storage unit 1035 or the FIFO buffer 1031 to output data onto the bus. Also, the control unit 1041 instructs the pseudo random data generation unit 1044 to fetch an initial value (S1309) with the timing when the data on the bus can be fetched.

As described above, the scramble unit 1040 subjects only the original data, namely the content of each data field in each data sector of the input data, to the scramble.

The above process is described more specifically. The header field is composed of the first 12 bytes of each data sector, followed by the data field. In the optical disc recording system 1000, the header field and the data field are transferred by a DMA transfer to the buffer memory 1061 in sequence as a single unit while the scramble unit 1040 subjects only the data field to the scramble. The header field is divided from the data field by counting three data transfers from the start in which 12 bytes of data are transferred.

Figure 14:
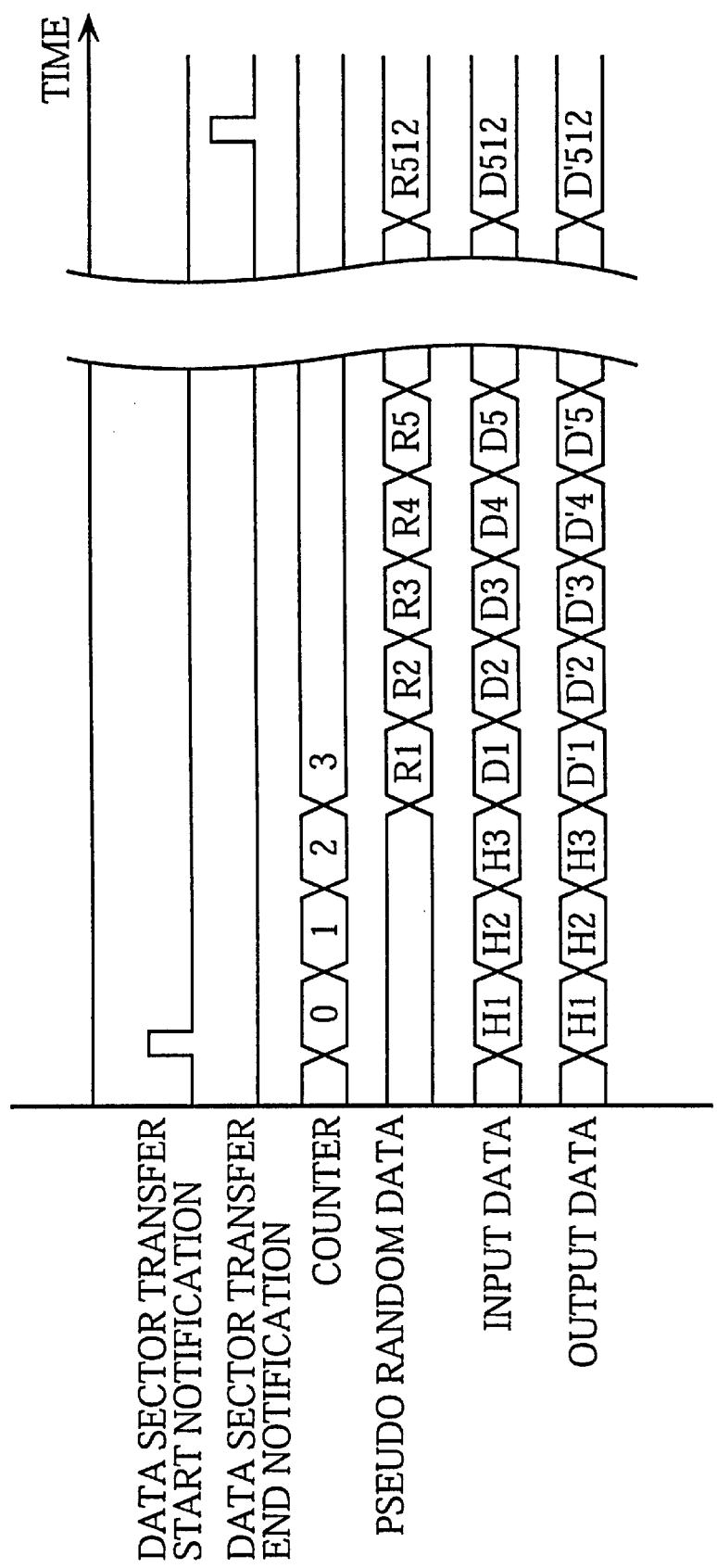
FIG. 14 shows the data state change in the scramble unit.

FIG. 14 shows the data state change in the scramble unit.

It is supposed that each piece of data represented in the drawing has 32 bits. The header field is represented by H1, H2, and H3, and the data field is represented by D1, D2, D3, . . . , and D512, where the header field and the data field are included the data input to the scramble unit 1040.

The output data is represented by H1, H2, H3, D'1, D'2, D'3, . . . , and D'512.

This shows a result of an exclusive OR function executed for each bit of: data input when the counter indicates 3; and the pseudo random data output from the pseudo random data generation unit 1044.

It should be noted here that when the original date having been subjected to the scramble is subjected to the descramble, the original data is restored. Here, the descramble is a reversed process of the scramble and can be achieved with the same construction as the scramble described earlier.

Variations

<Variation of Optical Disc Recording System>

A variation of the optical disc recording system 1000 will be described in this division.

Figure 15:
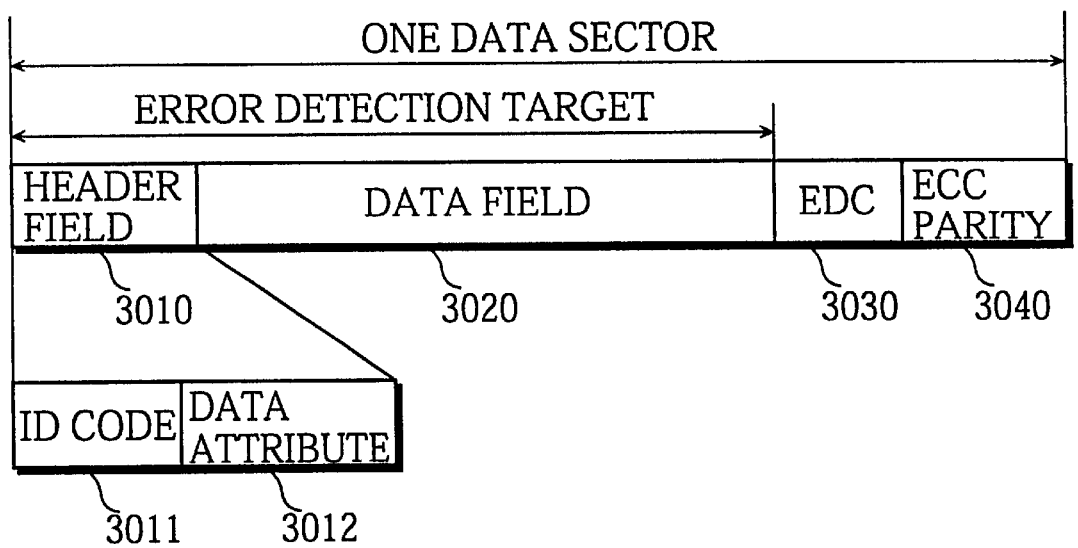
FIG. 15 shows an optical disc recording format.

FIG. 15 shows an optical disc recording format.

The following is a description when the format shown in FIG. 15 is used in the optical disc recording system 1000.

The present format differs from the DVD in the Embodiment in that the header field 3010 includes data attribute information and that an error-detecting code (EDC 3030) corresponding to both the header field and the data field obtained using both the header field and the data field.

The above process with the present format is achieved when the DMA controller 1020 of the optical disc recording system 1000 controls the data transfer so that the EDC generation unit 1050 fetches the transferred header field (see step S1202 in FIG. 9). With this arrangement, the error-detecting code corresponding to both the header field and the data field is stored in the buffer memory 1061. In this case, the header field and the data field should be supplied to the EDC generation unit 1050 in this order. Therefore, the steps S1202 and S1203 are especially significant from this point of view in which the data field is transferred to the buffer memory after the header field is transferred to the buffer memory.

A data attribute 3012 in the header unit 3010 is generated based on information sent from the external host apparatus (see step S1101 in FIG. 8). The microcomputer 1010 generates the data attribute based on the information and stores the generated data attribute into the additional information storage unit 1035.

Figure 16:
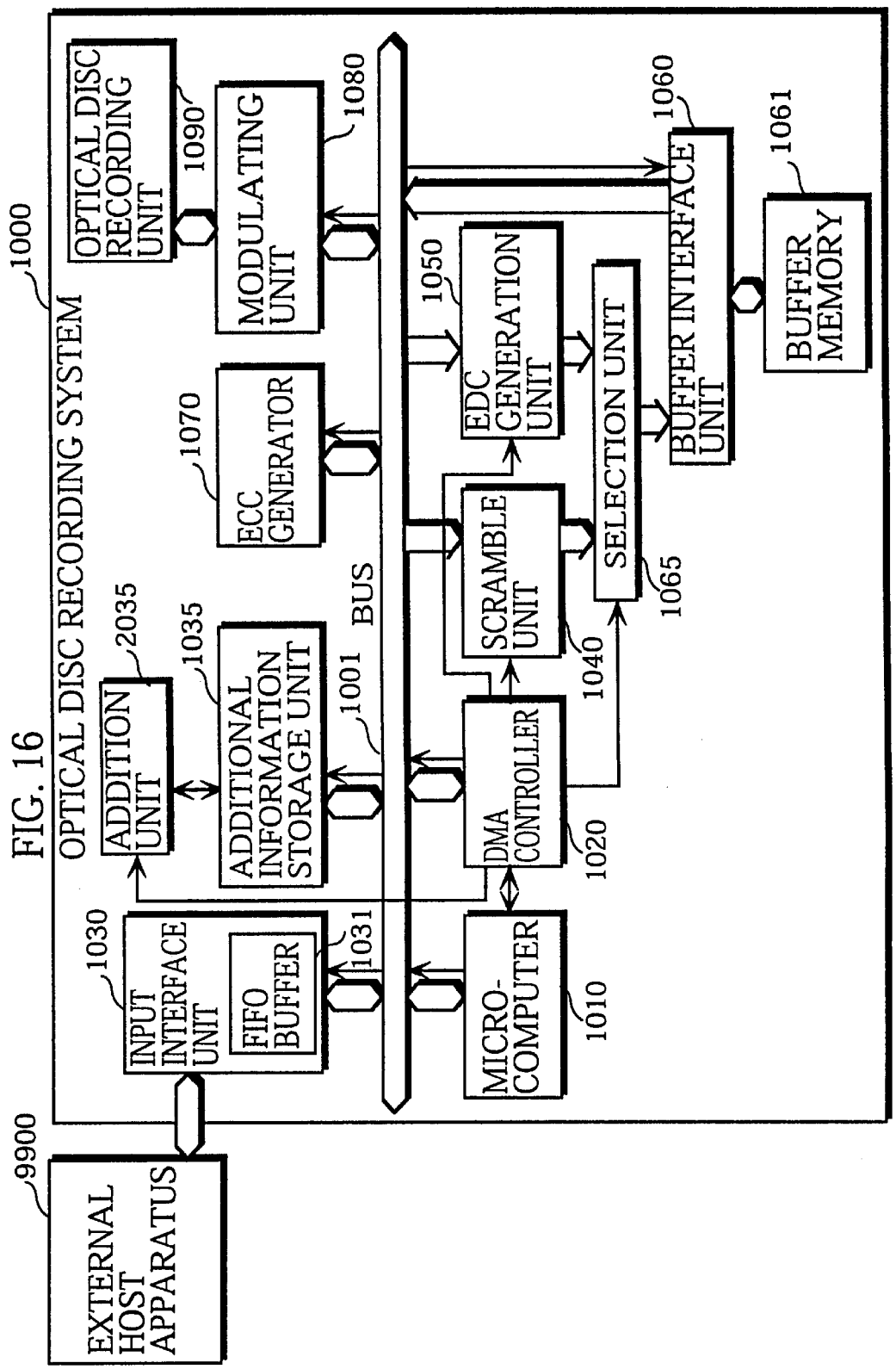
FIG. 16 shows a variation of the optical disc recording system 1000.

Alternatively, the optical disc recording system 1000 may include an addition unit 2035 as shown in FIG. 16. FIG. 16 shows a variation of the optical disc recording system 1000.

The addition unit 2035 increments the ID code value stored in the additional information storage unit by a certain amount when the unit receives the data sector transfer start notification from the DMA controller 1020.

The addition unit 2035 relieves the microcomputer 1010 of setting an ID code 3011 for each transferring of a data sector. That is, when receiving a notification from the external host apparatus 9900 that a plurality of pieces of original data (i.e., a plurality of data sectors) are transferred, the microcomputer 1010 only stores the data attribute and the ID code of the first data sector into the additional information storage unit 1035 After this, the microcomputer 1010 need not access the additional information storage unit 1035 since the ID code is automatically incremented by the addition unit 2035. However, when the data attribute should not be the same for every data sector in a sequence, the microcomputer 1010 needs to access the additional information storage unit 1035 to change the data attribute.

<Variation of Scramble Unit>

A scramble unit 2040 which is a variation of the scramble unit 1040 will be described in this division.

Figure 17:
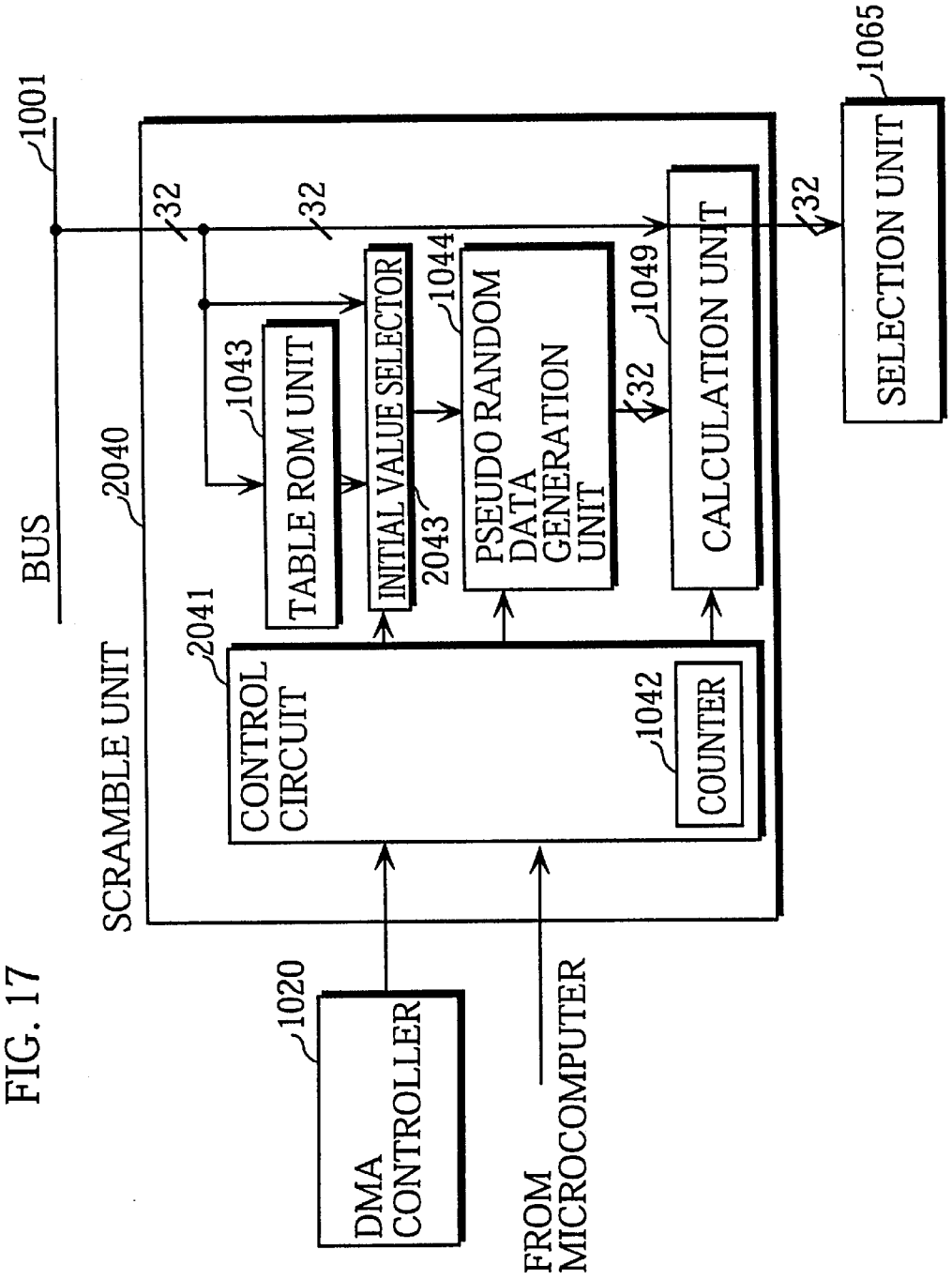
FIG. 17 shows the construction of the scramble unit 2040.

FIG. 17 shows the construction of the scramble unit 2040.

The scramble unit 2040 includes a control unit 2041, a table ROM unit 1043, an initial value selector 2043, a pseudo random data generation unit 1044, and a calculation unit 1049.

The scramble unit 2040 differs from the scramble unit 1040 in that it includes the initial value selector 2043 which selects, as an initial value to be supplied to the pseudo random data generation unit 1044, either data output from the table ROM unit 1043 or data input to the scramble unit 2040.

The initial value selector 2043 selects under control of the control unit 2041 either data output from the table ROM unit 1043 or data input to the scramble unit 2040, in accordance with an instruction sent from the microcomputer.

The present microcomputer corresponds to the microcomputer 1010. The present microcomputer allows the initial value selector 2043 to select data input to the scramble unit 2040 when the optical disc has a data format in which the initial value used for generating the pseudo random data is directly stored in the header field and allows the initial value selector 2043 to select data output from the table ROM unit 1043 when the optical disc has a data format in which the initial value used for generating the pseudo random data is indirectly stored in the header field.

With the above arrangement, it is possible for the optical disc to have a data format in which the initial value used for generating the pseudo random data is directly or indirectly stored in the header field.

Up to this point, the present invention, that is an error-detecting information adding apparatus, has been explained based on the embodiments (including variations). However, it is needless to say that the present invention is not limited to the embodiments (including variations). That is:

(1) In the embodiments, the bus 1001 has a 32-bit width. However, not limited to this, the bus may have any other bit width, such as a 16-bit width, and a 64-bit width. Also, in the embodiments, the table ROM unit 1043 stores 16 types of initial values which are selectively supplied to the pseudo random data generation unit 1044, and an initial value is selected from the 16 types of initial values in accordance with certain four bits among the input data. However, these figures may be replaced with other ones.

(2) In the embodiment, the header field is composed of an ID code, an error-correcting code related to the ID code, and a reserve area. In a variation, the header field is composed of an ID code and a data attribute. However, not limited to these example, the header field may include any information to be added to the original data. Also, in the embodiments, the header field is located before the data field. However, the header field may be placed after the data field or may be placed both before and after the data field. In this case, when the error-detecting code should correspond to both the header field and the data field, the header field and the data field are transferred in sequence in the order of their places by a DMA transfer.

(3) In the embodiment, the ID code includes information for identifying an initial value used for generating the pseudo random data for subjecting data to the scramble. However, not limited to this, the information may be stored in any other place in the header field. Also, the information may not be stored in the header field. Instead, the microcomputer may set the initial value into the pseudo random data generation unit. In this case, one initial value may be stored for each data sector or may be stored for each set of a plurality of data sectors. It is also possible for the microcomputer to receive data attribute information concerning the transferred data from the external host apparatus, refer to the information, and set an initial value most appropriate for the attribute into the pseudo random data generation unit.

In a variation of the scramble unit, the initial value selector 2043 selects, as an initial value to be supplied to the pseudo random data generation unit 1044, either data output from the table ROM unit 1043 or data input to the scramble unit 2040. However, the initial value selector 2043 may not be used. Instead either data output from the table ROM unit 1043 or data input to the scramble unit 2040 may directly be supplied to the pseudo random data generation unit 1044.

(4) The construction of the pseudo random data generation unit 1044 is not limited to that shown in FIG. 12 as far as the construction enables the unit to generate the pseudo random data. Similarly, the construction of the EDC generation unit 1050 is not limited that shown in FIG. 10 as far as the construction enables the unit to generate any codes used for error detection. In the embodiments, the calculation unit 1049 executes an exclusive OR function. However, not limited to this, the calculation unit 1049 may perform other calculation such as an addition or a subtraction.

(5) In the embodiments, the scramble unit 1040 subjects the data field to the scramble. However, not limited to this, the unit may subject the header field as well as the data field to the scramble. Alternatively, the data field may not be subjected to the scramble. In this case, the scramble unit 1040 outputs the input data as it is. That is, the unit functions merely as a 32-bit bus.

(6) In the embodiments, the DMA controller 1020 sends the data sector transfer start notification and the data sector transfer end notification to the selection unit 1065. However, these notifications may not be used as far as the output from the EDC generation unit 1050 is connected to the buffer interface unit 1060 with the timing when generation of the error-detecting code is completed.

Also, in the embodiments, the DMA controller 1020 sends the data sector transfer start notification and the data sector transfer end notification to the scramble unit 1040. However, these notifications may not be used as far as information indicating the target of the scramble process is sent.

(7) In the embodiments, the error-detecting code is described. However, the error-detecting code may be an error-correcting code including information with which errors can be corrected.

(8) In the embodiments, an optical disc recording system is described as an example. However, not limited to this, the present invention can be applied to a data transmission apparatus or the like since the invention relates to a technique for accumulating in a buffer memory the data supplied from an external data supply source after adding error-correcting codes to the supplied data.

INDUSTRIAL USE POSSIBILITY

The present invention, that is, an error-detecting information adding apparatus can be applied to apparatuses for recording information onto recording mediums such as optical discs, magnetic discs, etc. The present invention can also be applied to data transmission apparatuses.

What is claimed is:

1. An error-detecting information adding apparatus which generates an error-detecting code based on data and adds the generated error-detecting code to the data, the apparatus comprising:

a memory;

a data receiving unit for receiving original data from an external data supply source;

an error-detecting code generating unit which includes a first input unit and a first output unit, and generates the error-detecting code based on a plurality of pieces of data provided as an input to the first input unit, and provides an output of the generated error-detecting code from the first output unit;

a scramble unit which includes:

a pseudo random data generation unit for sequentially generating pseudo random data;

a second input unit; and a second output unit, outputs from the second output unit a result of an execution of an exclusive OR function executed with the pseudo random data generated by the pseudo random data generation unit and with original data input to the second input unit;

a first data bus connected to the data receiving unit, the first input unit, and the second input unit;

a selection unit for connecting the first output unit and the second output unit to the memory; and a data transfer unit which controls the selection unit to connect the second output unit to the memory and transfers the original data from the data receiving unit to the memory via the scramble unit while the second output unit is connected to the memory, and simultaneously transfers the original data from the data receiving unit to the first input unit of the error-detecting code generating unit, and immediately after the transfer of the original data to the memory, controls the selection unit to connect the first output unit to the memory and transfers the error-detecting code from the first output unit to the memory while the first output unit is connected to the memory.

2. The error-detecting information adding apparatus of claim 1 characterized by further comprising:

a header information storage unit for storing header information which is to be added to the original data;

a header information generating unit for generating the header information and writing the generated header information into the header information storage means, wherein the data transfer unit further transfers the header information generated by the header information generating means from the header information storage means to the memory and to the error-detecting code generating means before transferring the original data, and when transferring the header information to the memory, the data transfer unit transfers the header information to the memory at a place related to a place where the original data is stored.

3. The error-detecting information adding apparatus of claim 2 characterized in that:

the data transfer means includes:

a DMA controller, wherein an address specifying a location in the memory is set in the DMA controller as information indicating a destination of a DMA transfer, and the DMA controller performs a control so that a transfer of the header information, a transfer of the original data, and a transfer of the error-detecting code are continuously performer in the order in one DMA transfer, and the header information, the original data, and the error-detecting code are stored in the memory in the order starting from the location specified by the address set in the DMA controller.

4. The error-detecting information adding apparatus of claim 3 characterized in that:

the original data includes a predetermined number of pieces of data, the data supply source continuously supplies a plurality of pieces of original data, the header information includes an ID code which is used for identifying the original data, the header information generating means includes an addition unit for incrementing a value, and sequentially generates a plurality of pieces of header information while allowing the addition unit to sequentially increment the ID so that the ID codes included in the plurality of pieces of header information are different and correspond to the plurality of pieces of original data, and the data transfer means performs a transfer of a piece of header information, a transfer of a piece of original data, and a transfer of an error-detecting code continuously in the order in one DMA transfer for each of the plurality of pieces of original data.

5. The error-detecting information adding apparatus of claim 3 wherein:

the first data bus is further connected to the header information storage unit, the scramble unit provides an output of the header information from the second output unit when the header information has been provided as an input to the second input unit, and executes an exclusive OR function with the pseudo random data generated by the pseudo random data generation unit and with the original data and outputs from the second output unit a result of execution of the exclusive OR function when the original data has been provided as an input to the second input unit, and the data transfer unit controls the selection unit to connect the second output unit to the memory and transfers the header information and the original data from the data receiving unit to the memory via the scramble unit while the second output unit is connected to the memory.

6. The error-detecting information adding apparatus of claim 5 further comprising:

the pseudo random data generation unit sequentially generates the pseudo random data after receiving an initial value, the scramble means, further includes:
a table ROM unit which includes:
a table unit for storing a plurality of initial values,
and, when the header information has been input to the second input unit, sends one of the plurality of initial values stored in the table unit to the pseudo random data generation unit based on a part of or a whole of the header information.

7. The error-detecting information adding apparatus of claim 6 characterized in that:

the scramble means includes:
an initial value selecting unit for, when the header information has been input to the second input unit, selecting either of: sending a part of or a whole of the header information to the pseudo random data generation unit as an initial value; and instructing the table ROM unit to send one of the plurality of initial values stored in the table unit to the pseudo random data generation unit based on a part of or a whole of the header information.

8. A method for adding information for error detection which subjects original data supplied by a data supply source to a scramble by causing the original data to pass through a scramble circuit, adds an error-detecting code generated by an error-detecting code generator to the original data having been subjected to the scramble, and stores the original data with the error-detecting code into a memory, the method comprises:

a data receiving step for receiving the original data from the data supply source; and a data transfer step for transferring the original data from the data receiving step to the memory via the scramble circuit while an output of the scramble circuit is connected to the memory, and simultaneously, transferring the original data from the data receiving step to the error-detecting code generator and immediately after the transfer of the original data to the memory, transferring the error-detecting code from an output of the error-detecting code generator to the memory while the output of the error-detecting code generator is connected to the memory.

9. The method for adding information for error detection of claim 8 characterized by further comprising:

a header information generating step for generating the header information to be added to the original data; and a header information transfer step for transferring the header information generated in the header information generating step to the memory and to the error-detecting code generator before the data transfer step is executed, wherein in the header information transfer step, the header information is transferred to the memory at a place related to a place where the original data is stored in the data transfer step.

* * * * *